(12) United States Patent
Gholmieh et al.

(10) Patent No.: US 8,095,144 B2
(45) Date of Patent: Jan. 10, 2012

(54) METHOD AND APPARATUS FOR HASHING OVER MULTIPLE FREQUENCY BANDS IN A COMMUNICATION SYSTEM

(75) Inventors: Aziz Gholmieh, Del Mar, CA (US); Peter Gaal, San Diego, CA (US); Ragulan Sinnarajah, Markham, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/707,537

(22) Filed: Feb. 17, 2010

(65) Prior Publication Data

US 2010/0144361 A1      Jun. 10, 2010

Related U.S. Application Data

(63) Continuation of application No. 11/366,958, filed on Mar. 1, 2006, now Pat. No. 7,689,227.

(51) Int. Cl.
*H04W 72/00* (2009.01)
(52) U.S. Cl. .................................. 455/452.1
(58) Field of Classification Search ................ 455/452.1
See application file for complete search history.

(56) References Cited

U.S. PATENT DOCUMENTS

| | | | |
|---|---|---|---|
| 4,901,307 A | 2/1990 | Gilhousen et al. | |
| 5,101,501 A | 3/1992 | Gilhousen et al. | |
| 5,103,459 A | 4/1992 | Gilhousen et al. | |
| 6,330,446 B1 * | 12/2001 | Mori | 455/435.2 |
| 7,304,979 B2 * | 12/2007 | An et al. | 370/349 |
| 7,689,227 B2 * | 3/2010 | Gholmieh et al. | 455/452.1 |
| 2003/0096612 A1 | 5/2003 | Kim et al. | |
| 2004/0266445 A1 * | 12/2004 | Burgess et al. | 455/450 |
| 2006/0094437 A1 * | 5/2006 | Sinnarajah et al. | 455/452.1 |

FOREIGN PATENT DOCUMENTS

| | | |
|---|---|---|
| EP | 1315390 A1 | 5/2003 |
| EP | 1494497 A2 | 1/2005 |
| JP | 11298945 | 10/1999 |
| JP | 2005045778 | 2/2005 |
| JP | 2008518519 | 5/2008 |
| KR | 1020030042396 | 5/2003 |
| KR | 1020050002638 | 1/2005 |
| RU | 2073913 C1 | 2/1997 |
| WO | WO0241605 A2 | 5/2002 |
| WO | WO2004016012 A1 | 2/2004 |
| WO | WO2004019522 A1 | 3/2004 |

OTHER PUBLICATIONS

International Search Report—PCT/US06/007809—International Search Authority—European Patent Office—Jul. 5, 2006.
Written Opinion—PCT/US06/007809—International Search Authority—European Patent Office—Jul. 5, 2006.

\* cited by examiner

*Primary Examiner* — Marivelisse Santiago Cordero
(74) *Attorney, Agent, or Firm* — Kristine U. Ekwueme

(57) ABSTRACT

Method and apparatus for hashing mobile stations to frequencies in a communication system. The method uses two-level hashing to assign a mobile station first to a frequency band and then to a specific frequency within the frequency band. Embodiments allow for weights to be assigned to frequencies and mobiles hashed to the weighted frequencies. Weighting allows for a non-uniform distribution of mobile stations among frequencies to optimize system operating parameters.

46 Claims, 13 Drawing Sheets

| FIELD | LENGTH (BITS) |
|---|---|
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |

FIG. 4

| FIELD | LENGTH (BITS) |
|---|---|
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |

FIG. 4
(CONTINUED)

| FIELD | LENGTH (BITS) |
|---|---|
| MSG_TYPE; ('00000001') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8´ MSID_LEN |
| AUTH_MODE | 2 |
| AUTHR | 0 OR 18 |
| RANDC | 0 OR 8 |
| COUNT | 0 OR 6 |
| REG_TYPE | 4 |
| SLOT_CYCLE_INDEX | 3 |
| MOB_P_REV | 8 |
| SCM | 8 |
| MOB_TERM | 1 |
| RESERVED | 6 |

FIG. 6

| FIELD | LENGTH (BITS) |
|---|---|
| MSG_TYPE | 00000111 |

ONE OR MORE OCCURRENCES OF THE FOLLOWING RECORD:

| ACK_SEQ | 3 |
|---|---|
| MSG_SEQ | 3 |
| ACK_REQ | 1 |
| VALID_ACK | 1 |
| ADDR_TYPE | 3 |
| ADDR_LEN | 4 |
| ADDRESS | 8´ ADDR_LEN |
| ORDER | 011011 |
| ADD_RECORD_LEN | 001 |
| ORDER-SPECIFIC FIELDS (IF USED) | 00000001 |

FIG. 7

| FIELD | LENGTH (BITS) |
|---|---|
| MSG_TYPE; ('00000001') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8' MSID_LEN |
| AUTH_MODE | 2 |
| AUTHR | 0 OR 18 |
| RANDC | 0 OR 8 |
| COUNT | 0 OR 6 |
| REG_TYPE | 4 |
| SLOT_CYCLE_INDEX | 3 |
| MOB_P_REV | 8 |
| SCM | 8 |
| MOB_TERM | 1 |
| RESERVED | 6 |

FIG. 8

| FIELD | LENGTH (BITS) |
|---|---|
| MSG_TYPE; ('00000001') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8' MSID_LEN |
| AUTH_MODE | 2 |
| AUTHR | 0 OR 18 |
| RANDC | 0 OR 8 |
| COUNT | 0 OR 6 |
| REG_TYPE | 4 |
| SLOT_CYCLE_INDEX | 3 |
| MOB_P_REV | 8 |
| SCM | 8 |
| MOB_TERM | 1 |
| RESERVED | 6 |

FIG. 8
(CONTINUED)

| FIELD | LENGTH (BITS) |
|---|---|
| MSG_TYPE; ('00000100') | 8 |
| ACK_SEQ | 3 |
| MSG_SEQ | 3 |
| ACK_REQ | 1 |
| VALID_ACK | 1 |
| ACK_TYPE | 3 |
| MSID_TYPE | 3 |
| MSID_LEN | 4 |
| MSID | 8′ MSID_LEN |
| AUTH_MODE | 2 |
| AUTHR | 0 OR 18 |
| RANDC | 0 OR 8 |
| COUNT | 0 OR 6 |
| MOB_TERM | 1 |
| SLOT_CYCLE_INDEX | 3 |
| MOB_P_REV | 8 |
| SCM | 8 |
| REQUEST_MODE | 3 |
| SPECIAL_SERVICE | 1 |
| SERVICE_OPTION | 0 OR 16 |
| PM | 1 |
| DIGIT_MODE | 1 |
| NUMBER_TYPE | 0 OR 3 |
| NUMBER_PLAN | 0 OR 4 |

FIG. 9

| FIELD | LENGTH (BITS) |
|---|---|
| MSG_TYPE; ('00000001') | 8 |
| PILOT_PN | 9 |
| CONFIG_MSG_SEQ | 6 |
| SID | 15 |
| NID | 16 |
| REG_ZONE | 12 |
| TOTAL_ZONES | 3 |
| ZONE_TIMER | 3 |
| MULT_SIDS | 1 |
| MULT_NIDS | 1 |
| BASE_ID | 16 |
| BASE_CLASS | 4 |
| PAGE_CHAN | 3 |
| MAX_SLOT_CYCLE_INDEX | 3 |
| HOME_REG | 1 |
| FOR_SID_REG | 1 |
| FOR_NID_REG | 1 |
| POWER_UP_REG | 1 |
| POWER_DOWN_REG | 1 |
| PARAMETER_REG | 1 |
| REG_PRD | 7 |
| BASE_LAT | 22 |
| BASE_LONG | 23 |
| REG_DIST | 11 |
| SRCH_WIN_A | 4 |

FIG. 10

METHOD AND APPARATUS FOR HASHING OVER MULTIPLE FREQUENCY BANDS IN A COMMUNICATION SYSTEM

CLAIM OF PRIORITY UNDER 35 U.S.C. §120

The present Application for Patent is a Continuation and claims priority to patent application No. 11/366,958 entitled "Method and Apparatus for Hashing over Multiple Frequency Bands in a Communication System" filed Mar. 1, 2006, now allowed, and assigned to the assignee hereof and hereby expressly incorporated by reference herein

BACKGROUND

1. Field

The present invention pertains generally to communications, and more specifically to a novel and improved method and apparatus for hashing over multiple frequency bands in a communication system.

2. Background

Communication systems and wireless systems in particular, are designed with the objective of efficient allocation of resources among a variety of users. Wireless system designers in particular aim to provide sufficient resources to satisfy the communication needs of its subscribers while minimizing costs. Efficient use of resources requires prompt assignment of mobile stations to specific frequencies.

In a wireless communication system employing a Code Division-Multiple Access (CDMA) scheme or Wideband Code Division Multiple Access (WCDMA) each of the subscriber units is assigned code channels at designated time intervals on a time multiplexed basis. A central communication node, such as a Base Station (BS) or Node B, implements the unique carrier frequency or channel code associated with the subscriber to enable exclusive communication with the subscriber. Time Division Multiple Access (TDMA) schemes may also be implemented in landline systems using physical contact relay switching or packet switching. A CDMA system may be designed to support one or more standards such as: (1) the "TIA/EIA/IS-95-B Mobile Station-Base Station Compatibility Standard for Dual-Mode Wideband Spread Spectrum Cellular System" referred to herein as the IS-95 standard; (2) the standard offered by a consortium named "3rd Generation Partnership Project" referred to herein as 3GPP; and embodied in a set of documents including Document Nos. 3G TS 25.211, 3G TS 25.212, 3G TS 25.213, and 3G TS 25.214, 3G TS 25.302, referred to herein as the W-CDMA standard; (3) the standard offered by a consortium named "3rd Generation Partnership Project 2" referred to herein as 3GPP2, and TR-45.5 referred to herein as the cdma2000 standard, formerly called IS-2000 MC, or (4) some other wireless standard.

CDMA2000 is an improvement on TIA/EIA-95. It provides a significant improvement in voice capacity and extended data capability and is backward compatible with TIA/EIA-95 mobiles. When a mobile station moves between base stations in a CDMA2000 system the mobiles must register and be assigned a frequency for communication. The frequency assignment occurs during a registration process. Registration includes a hashing process to assign a frequency to the mobile station. The mobile must re-register when changing between base stations, with each change forcing a new hash to a new frequency, and in many cases a new frequency band. Hashing is triggered for any change in the frequency distribution or frequency weights. Frequency distribution and weighting is an important consideration for balancing system loading and ensuring efficient system operation. The mobile station also updates the system overhead information each time a hash is performed. This can result in additional and excessive frequency changes, as every frequency change results in system acquisition and reading system overhead information. Unfortunately, while re-acquiring the system pages messages directed to the mobile station may be missed.

Accordingly, there is a need for a method and apparatus for hashing mobiles over multiple bands while avoiding unnecessary frequency changes.

SUMMARY

Embodiments disclosed herein address the above stated needs by providing a means for hashing mobiles over multiple frequency bands. One embodiment provides method comprising hashing a mobile station to a frequency band; and then hashing the mobile station to a specific frequency within that frequency band.

In another embodiment, A method comprising:
hashing a mobile station to a frequency band using inter-band hashing, wherein the inter-band hashing is based on a message.

In another embodiment, a method for interband hashing is provided. The method first hashes a mobile station to a frequency band using interband hashing. The interband hashing is based on a message from the base station.

A still further embodiment provides a method for hashing a mobile station to a particular frequency by sending a message from a first device to a second device, receiving the information in the first device, and then hashing the first device to a frequency band based on the information in the message.

An additional embodiment provides for weight-based hashing. Weight-based hashing may result in a non-uniform distribution of mobile stations among the supported frequencies. Each frequency within a frequency band is assigned a weight. The mobile stations are then hashed to frequencies, with the heavier weighted frequencies being assigned more mobile stations than lighter weighted frequencies.

Weight-based hashing may also be used with more than one frequency band. In this case, each frequency within each frequency band may be assigned a weight. Mobile stations receive a message containing a list of frequency bands with the weights assigned to frequencies within those frequency bands. The mobile station is hashed to a frequency band and to a specific frequency within that band based on the assigned weights.

Yet another embodiment provides for computer instructions for hashing a mobile station to a frequency band and then hashing the mobile station to a specific frequency within the frequency band.

A still further embodiment provides computer instructions for sending a message from a first device to a second device, receiving information in the message at the first device, and hashing the first device to a frequency band based on the information in the message.

A further embodiment provides computer instructions for assigning weights to each frequency within a frequency band, hashing a mobile station to a frequency based on the weight assigned by the computer instructions to that frequency, and distributing mobile stations across frequencies based on the weights assigned to the frequencies. This may result in a non-uniform distribution of mobile stations across the different frequencies.

Another embodiment provides computer instructions for assigning weights to each frequency within more than one frequency band, sending a message to a mobile station containing a list of frequency bands and a list of frequencies within those frequency bands. Each frequency within a frequency band has an assigned weight. The mobile station reviews the list of frequency bands and frequencies and eliminates those frequencies it is not equipped to support. The mobile sorts the bands and frequencies in order to have a stable hashing process across base stations. The mobile is then hashed to a frequency band and then hashed to a frequency within that frequency band, based on the computer instructions.

One embodiment provides a network comprising: means for hashing a mobile station to a frequency band; means for determining frequency band assignments for each mobile station; means for hashing the mobile station to a specific frequency within the frequency band; and means for repeating the hashing process for each mobile station in the network.

Another embodiment provides an apparatus that includes: means for hashing a mobile station to a frequency band; and means for hashing the mobile station to a specific frequency within the frequency band.

A further embodiment provides an apparatus that includes means for hashing a mobile station to a frequency band using inter-band hashing. In this embodiment, the inter-band hashing is carried out based on a message.

An additional embodiment provides an apparatus for multiple band hashing using assigned frequency weights. The apparatus includes means for assigning a weight to each frequency within each frequency band, means for assigning a weight to a band based on weights of frequencies within that band, means for sending a message to a mobile station containing a list of frequency bands as well as a list of frequencies within those frequency bands. Each individual frequency is assigned a weight and this information is sent to the mobile station in a message. Additional means is also provided for the mobile station to review the frequency bands and frequencies within those bands. The mobile contains means for eliminating frequencies it does not support. The mobile contains means for sorting the bands and frequencies in order to have a stable hashing process across base stations. The apparatus also includes means for hashing a mobile station to a frequency band and means for hashing a mobile station to a frequency within the frequency band, based on the assigned weights.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein:

FIG. 4 illustrates the fields and field lengths of the synchronization channel message.

FIG. 6 details the structure of the registration message.

FIG. 7 shows the fields and field lengths for the request order.

FIG. 8 shows the fields and field lengths for parameter change non-autonomous registration.

FIG. 9 shows the fields and field lengths for the origination message.

FIG. 10 shows the fields and field lengths for the system parameters message.

DETAILED DESCRIPTION OF THE INVENTION

Figure 1:
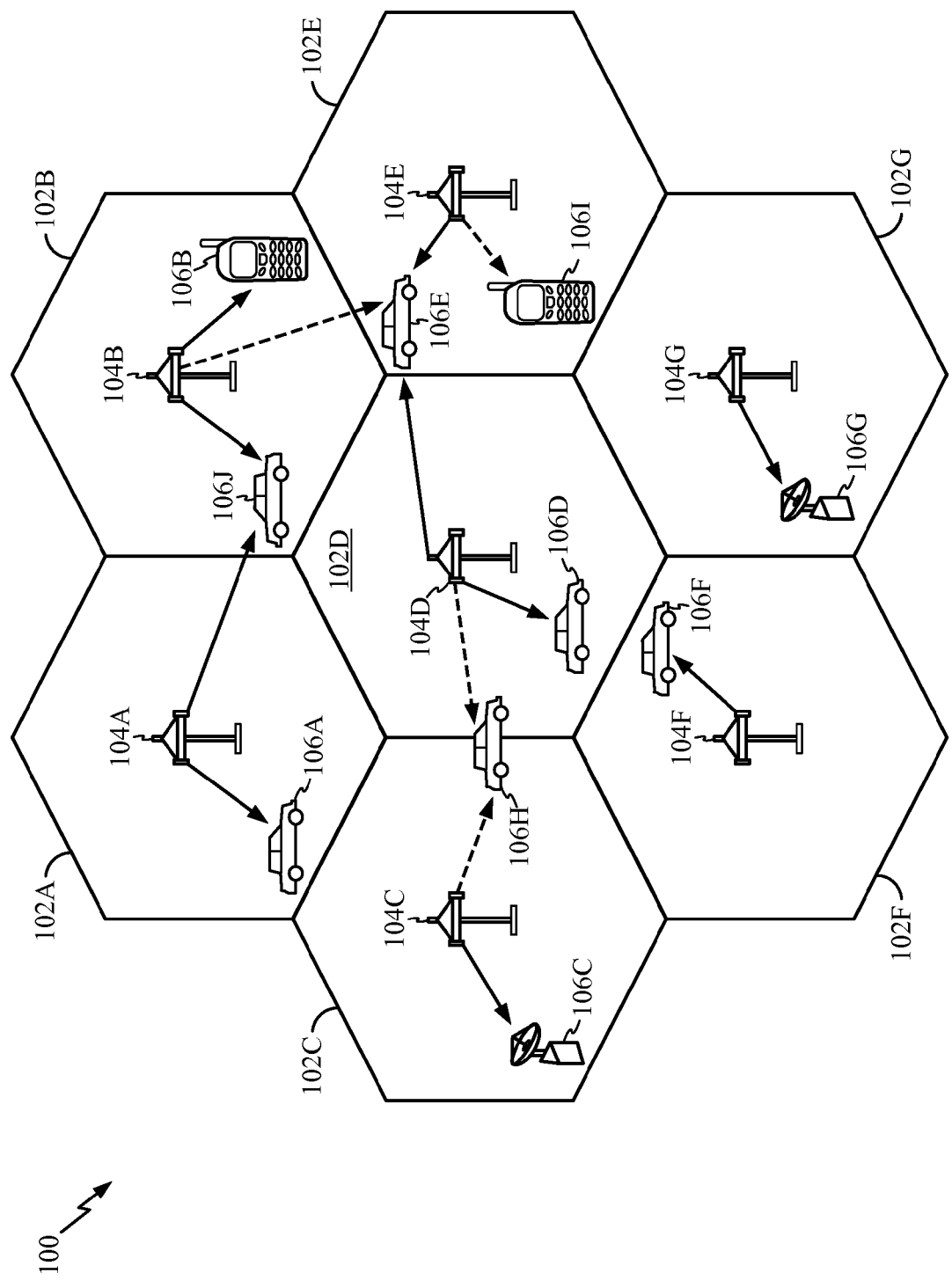
FIG. 1 is a wireless communication system according to an embodiment of the invention.

A modern day communication system is desired to support a variety of applications.

One such communication system is a code division multiple access (CDMA) system which conforms to the "TIA/EIA-95 Mobile Station-Base Station Compatibility Standard for Dual-Mode Wideband Spread Spectrum Cellular System" and its progeny, hereinafter referred to as IS-95. The CDMA system allows for voice and data communications between users over a terrestrial link. An updated version of a CDMA system is known as CDMA2000. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration". Any embodiment described herein as "exemplary" is not necessarily to be construed as preferred or advantageous over other embodiments. Likewise, the term "embodiments of the invention" does not require that all embodiments of the invention include the discussed feature, advantage, or mode of operation.

In a CDMA system or CDMA2000 system, communications between users are conducted through one or more base stations. In wireless communication systems, forward link refers to the channel through which signals travel from a base station to a subscriber station, and reverse link refers to the channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial network (e.g., Internet) through a connection with a serving base station. In wireless communications such as those conforming to IS-95, forward link and reverse link signals are transmitted within disjoint frequency bands.

The telephone system is composed of two segments: the wired subsystem and the wireless subsystem. The wired system is the Public Switched Telephone Network (PSTN) and the Internet. It may also include instrumentation, video or other services. The wireless subsystem includes the Base Station subsystem, which involves the Mobile Switching Center (MSC), the Base Station Controller (BSC), the Home Location Register (HLR), the Visitor Location Register (VLR), the Base Transceiver Station (BTS), and the Mobile Station (MS).

FIG. 1 serves as an example of a communications system 100 that supports a number of users and is capable of implementing at least some aspects and embodiments presented herein. System 100 provides communication for a number of cells 102A through 102G, each of which is serviced by a corresponding base station (BS) 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single and multiple transmit and receive antennas.

Mobile Stations (MSs) 106 in the coverage area may be fixed (i.e., stationary) or mobile. As shown in FIG. 1, various MSs 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention and is incorporated by reference in its entirety.

The downlink refers to transmission from the BS to the MS, and the uplink refers to transmission from the MS to the BS. In the exemplary embodiment, some of MSs 106 have multiple receive antennas and others have only one receive antenna. In FIG. 1, BS 104A transmits data to MSs 106A and 106J on the downlink, BS 104B transmits data to MSs 106B and 106J, BS 104C transmits data to terminal 106C, and so on.

Increasing demand for wireless data transmission and the expansion of services available via wireless communication technology have led to the development of specific data services. As the amount of data transmitted and the number of transmissions increases, it becomes increasingly important to utilize available bandwidth efficiently. Additionally, interference becomes a significant problem. Channel conditions may affect which transmissions may be sent efficiently. There is a need, therefore, for a method to hash mobile stations over multiple bands while avoiding unnecessary frequency changes. In the exemplary embodiment, system 100 illustrated in FIG. 1 is consistent with a CDMA2000 wireless communication system.

Figure 2:
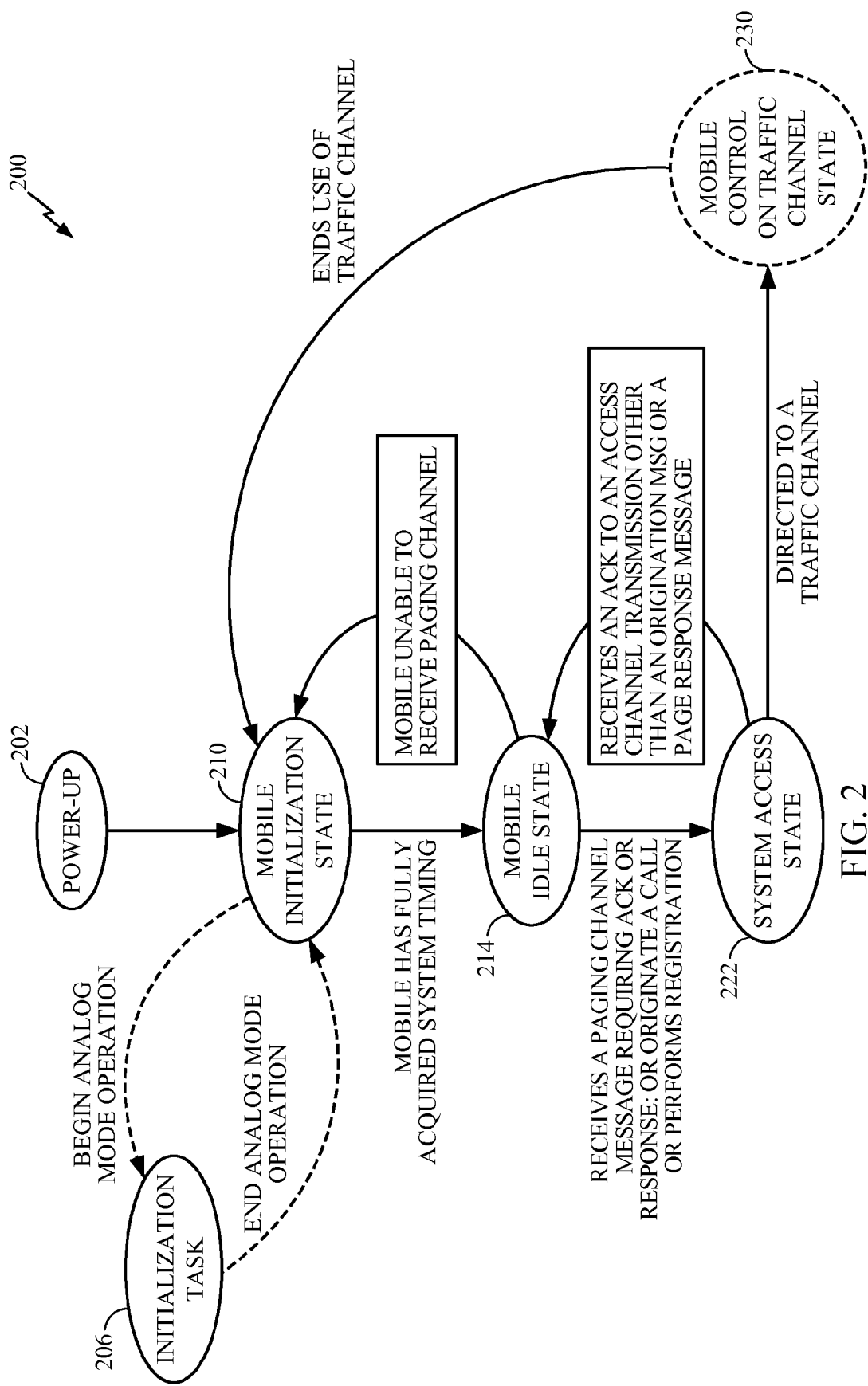
FIG. 2 is a call scheduling overview diagram.

FIG. 2 shows the states a mobile station passes through during call processing in a CDMA2000 wireless communication system. FIG. 2 shows an overview of the call processing states, 200. Call processing begins when the MS powers up, 202. After power up, the MS enters the Mobile Initialization state, 210. In the Mobile Station Initialization state, the mobile processes the Pilot and Sync Channels to acquire and synchronize with the CDMA system. Upon entering the Mobile Initialization state, the MS begins analog mode operations as part of the Initialization Task, 206. Once the Initialization Task 206 is completed analog mode operations end as the mobile has fully acquired the system timing. After acquiring the system timing, the mobile enters the Idle State, 214.

While in the Idle State, the mobile monitors the Paging Channel or the Forward

Common Control Channel (F-CCH) to receive overhead and mobile-directed messages (such as a page message that indicates an incoming call) from the BS. Power control may also be performed while the MS is in the Idle State, 214. In addition, the MS monitors the broadcast control channel (BCCH), performs registration, idle handoff, and position determination. These actions are necessary to assign a frequency band and frequency to the MS. The Paging Channel message may require the mobile to respond with an acknowledgement (ACK) message or originate a call, or perform registration. If the MS is unable to receive the paging channel the mobile may return to the Mobile Initialization State, 210.

In the System Access State 222, the MS sends messages to the base station BS on the Access Channel or Enhanced Access Channel. The BS listens to these channels, and responds to the MS on either the Paging Channel or F-CCH. The MS receives an acknowledgement (ACK) to an Access Channel transmission other than an Origination Message or a Page Response Message.

In the Mobile Station Control on the Traffic Channel state, 230, the BS and MS communicate by using dedicated Forward and Reverse Traffic Channels, which carry user information, such as voice and data.

Figure 3:
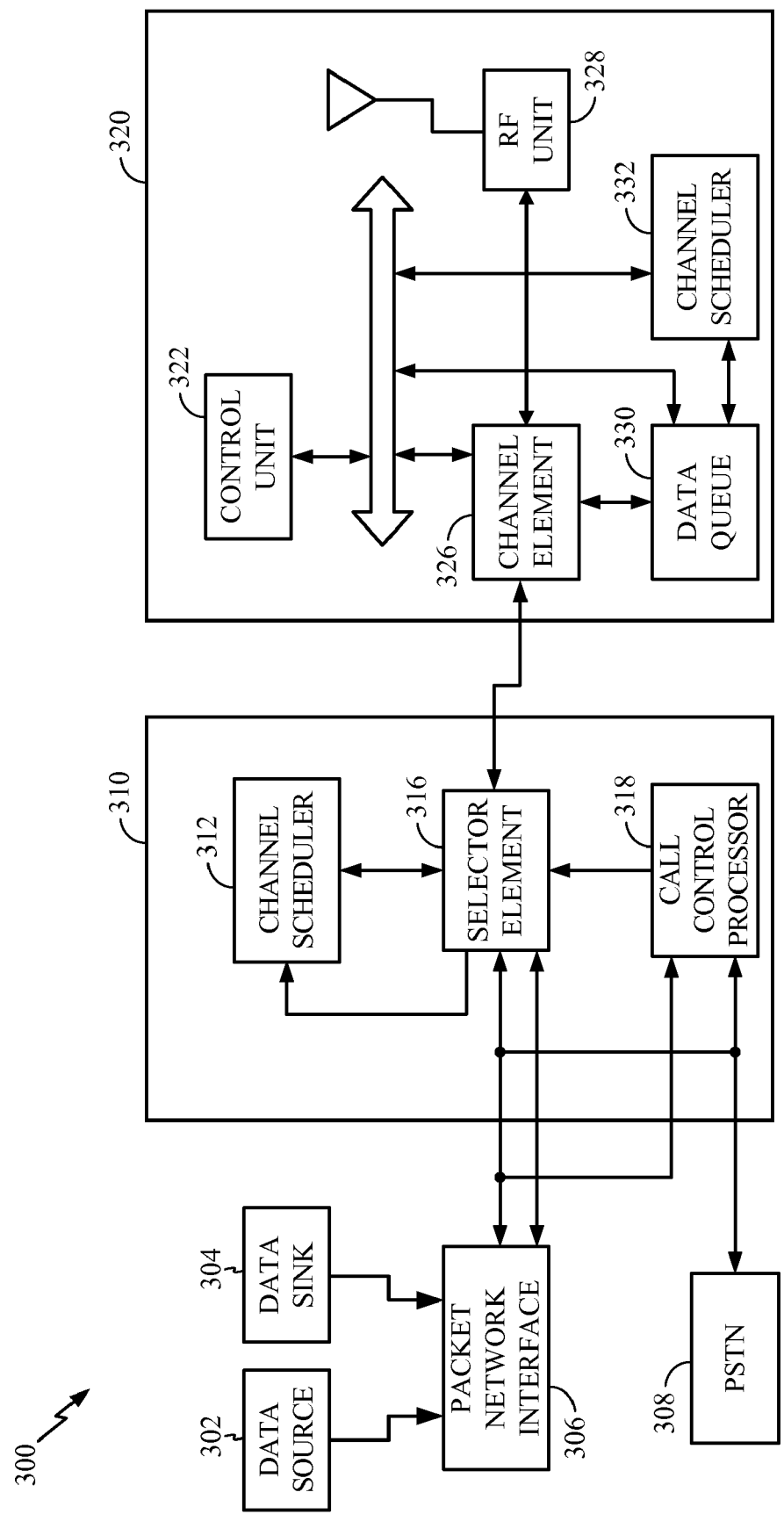
FIG. 3 is a wireless communication system supporting hashing over multiple bands while avoiding unnecessary frequency changes.

FIG. 3 is one example of a communication system supporting data transmissions and adapted for scheduling transmissions to multiple users. FIG. 3 illustrates the operation of the base stations 104 from FIG. 1. FIG. 3 is detailed hereinbelow, wherein specifically, a base station, 320 and base station controller (BSC) 310 interface with a packet network interface 306. Base station controller 310 includes a channel scheduler 312 for scheduling transmissions in system 200. The channel scheduler 312 determines which data is to be transmitted.

In addition, the channel scheduler 312 selects the particular data queue for transmission.

The associated quantity of data to be transmitted is then retrieved from a data queue 330 and provided to the channel element 326 for transmission to the remote station associated with the data queue 330. As discussed below, the channel scheduler 312 selects the queue for providing the data, which is transmitted in a later transmission.

Base station controller 310 may contain many selector elements 316, although only one is shown in FIG. 3 for simplicity. Each selector element 316 is assigned to control communication between one or more base stations 320 and one mobile station (not shown). If selector element 316 has not been assigned to a given remote station, call control processor 318 is informed of the need to page the remote station. Call control processor 318 then directs base station 320 to page the remote station.

Data source 302 contains a quantity of data, which is to be transmitted to a given remote station. Data source 302 provides the data to packet network interface 306. Packet network interface 306 receives the data and routes the data to the selector element 316. Selector element 316 then transmits the data to each BS 320 in communication with the target MS remote station. In the exemplary embodiment, each base station 320 maintains a data queue 330, which stores the data to be transmitted to the MS.

The MS begins an initialization process when making a call. The MS first determines the type of system timing by searching for usable pilot signals. The pilot signal carries no information, but the MS can align its own timing by correlating with the pilot signal. When this correlation is found, the MS has synchronization with the synchronization channel and can read the synchronization channel message to refine its timing further. The MS may search for up to 15 seconds on a single CDMA channel before declaring failure and returning to system determination to select another channel or another system. The searching process is not standardized and the time needed to acquire the system may depend on the system implementation.

In CDMA2000, there may be many pilot channels on a single CDMA channel. These pilots may include orthogonal transmit diversity pilots, space time spreading pilots, and auxiliary pilots. During system acquisition, the mobile will not find any of these pilots because those pilots are on different Walsh codes and during the acquisition process the mobile is searching only for $Walsh_0$.

Once the mobile has synchronization, it reads the sync channel message to further refine its timing. FIG. 4 shows the fields and field lengths found in the sync channel message. The synch channel message is transmitted continuously on the synchronization channel. This message provides the mobile with information to refine its timing and to read the paging channel. Typically, only the LC_STATE and SYS_TIME fields change each time the sync channel message is transmitted.

The mobile receives information from the base station in the synch channel message that allows it to determine whether it can communicate with that base station. This information is found in the following fields in the sync channel message:
  MOB_P_REV—This field contains a value that is the maximum protocol revision supported by the mobile. This value is stored by the mobile.
  P-REV—The maximum protocol revision supported by the base station.
  MIN_P_REV—The minimum protocol revision of a mobile that the base station supports. If a mobile acquires a sync channel, and MOB_P_REV <MIN_P_REV, it does not attempt to acquire service on that system, but returns to system determination to try to choose another system.
  P_REV_IN_USE—A value computed by the mobile that is the protocol revision currently being used by the mobile. Whenever the mobile receives a sync channel message, it sets the value of P_REV_IN_USE to the lesser of P_REV and MOB_P_REV. The mobile will not request services or features that are not supported by P_REV_IN_USE.

Once the mobile has completed system acquisition the mobile enters the idle state. The term idle state is something of a misnomer. The mobile can be very busy in the idle state. In general, the mobile receives one of the paging channels and processes the message on that channel. Overhead or configuration message are compared to the stored sequence numbers to ensure that the mobile has the most current parameters. Mobile-directed messages are checked to determine the intended subscriber.

While in the idle state the mobile may perform the following functions:
  perform paging channel monitoring;
  perform registration procedures;
  perform the response to overhead information operation (in response to a system parameters message, neighbor list message, CDMA channel list message or, access parameters message);
  perform the mobile station page match operation;
  perform the mobile station order and message processing operation;
  perform the mobile station origination operation;
  perform the mobile station message transmission operation, if directed by the user to transmit a message;
  perform the mobile station power-down operation.

CDMA2000 uses four additional overhead messages: user zone identification message, private neighbor list message, extended global service redirection message, and the extended CDMA channel list message.

The user zone identification message and private neighbor list message are used to support CDMA tiered services.

The extended global service redirection message redirects mobiles to another system. The extended form of the message includes the ability to redirect a mobile as a function of its protocol revision.

The extended CDMA list message provides mobiles with the list of CDMA channels used by the system. The extended form of the message includes information about the availability of quick paging channels, and whether transmit diversity is supported on the available CDMA channels.

The base station may support multiple paging channels (Walsh functions) and/or multiple CDMA channels (frequencies). The mobile uses a hash function based on its international mobile subscriber identity (IMSI) to determine which channel and frequency to monitor in the idle state. The base station uses the same hash function to determine which channel and frequency to use when paging the mobile.

Figure 5:
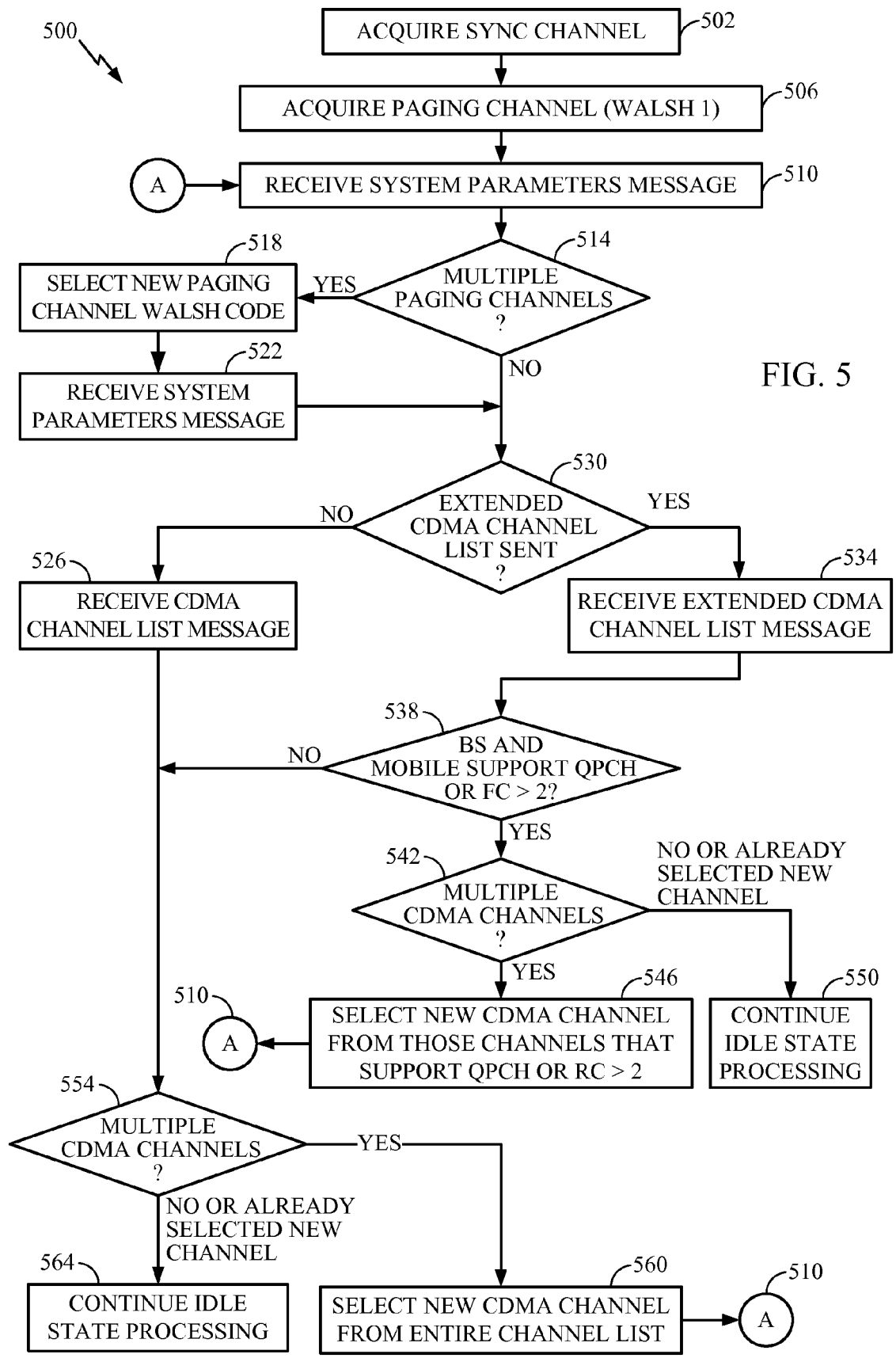
FIG. 5 illustrates the method of hashing used on the forward paging channel (FPCH).

FIG. 5 shows the steps of the hashing function for the forward paging channel (F-PCH). The mobile always starts by using the primary paging channel, which is transmitted on Walsh channel 1. The system parameters message indicates whether there are multiple Walsh channels, and if so, the mobile uses the hash function to select a new one. The system parameters message also indicates whether the CDMA2000 extended CDMA channel list message is being sent on the F-PCH.

The method of hashing, 500 begins when the mobile acquires the sync channel in step 502. In step 506 the mobile acquires the paging channel (Walsh 1). After acquiring the paging channel the mobile receives the system parameters message in step 510. Next, the mobile determines in step 514 if the system uses multiple paging channels. If the system does use multiple paging channels, a new paging channel Walsh code is selected in step 518. After selecting a new paging channel Walsh code the mobile receives the system parameters message in step 522. If the system does not use multiple paging channels the next step in the process is to determine if the extended CDMA channel list has been sent in step 530. If the system does use multiple paging channels, after selecting a new paging channel Walsh code in step 518 and receiving the system parameters message in step 522, the mobile proceeds to step 530 to determine if the extended CDMA channel list has been sent. If the extended CDMA channel list message was sent it is received in step 534. If the mobile does not receive the extended CDMA channel list the mobile receives the CDMA channel list message in step 526.

If the mobile receives the CDMA channel list message, the mobile determines whether multiple CDMA channels are being sent in step 554. If so, the mobile uses the hash function to select a new frequency in step 560, tunes to that frequency and starts over with acquiring and processing the overhead messages. If only one channel is sent the mobile continues idle state processing in step 564.

If the mobile receives the extended CDMA channel list message in step 534, the mobile determines whether the base station and the mobile support the quick paging channel (QPCH) step 538 or radio configurations greater then 2, step 538. If so, the base station indicates in the message which of the CDMA frequencies support those capabilities, and the mobile selects from only those channels. Step 542 shows the step of determining if the system supports multiple CDMA channels. If not the mobile continues idle state processing in step 550. If so the mobile proceeds to select a channel in step 546 as described above.

Registration is the process by which a mobile makes its whereabouts known to the cellular system. Cellular systems use registration to balance the load between the access channel and the paging channel. The hashing method described above works in conjunction with registration to assign frequencies in accordance with the load balancing operations of registration. Without some type of registration, mobiles would have to be paged over the entire cellular system, resulting in the need to transmit many pages per call delivery for a system with multiple base stations. A mobile would need to be paged as many times as there are base stations in the system.

Requiring a mobile to register every time it moves to the coverage area of a new base station increases the number of pages required. Due to the transmission of the registration messages and their acknowledgements an overwhelming load can be created on both the paging and access channels.

CDMA systems offer multiple ways to initiate registration. The different types of registration may be enabled or disabled independently, which allows cellular carriers to tailor any subset of registration methods to optimize their systems. The registration methods chosen by a cellular carrier are a function of parameters such as the cellular system size, expected mobility within the system, and call delivery statistics. The base station controls the types of registrations supported by fields in the system parameters message, extended system parameters message, and ANSI-41 system parameters message.

CDMA2000 supports ten registration methods. These methods are: power up, power down, timer based, distance based, zone based, ordered, implicit, traffic channel, parameter, and user zone based.

Non-autonomous registration is also performed in a CDMA2000 system. The following types of registration are considered non-autonomous:

Ordered registration—The mobile registers with the system after the base station sends a registration order.

Traffic channel registration—The base station may obtain registration about a mobile by sending a status request order on the traffic channel, and receiving a status response message. The base station may then notify the mobile that it is registered by sending a mobile station registered message.

Parameter change registration—The mobile registers when certain parameters that affect the process of delivering calls change in the mobile. These parameters are the mobile station's station class mark, preferred slot cycle, and mobile terminated call indicator.

Implicit registration—Implicit registration occurs when the mobile successfully sends an origination message or a page response message. These messages convey sufficient information to identify the mobile and its location.

User Zone based registration—The tiered services supported by CDMA2000 may require that the mobile register when it enters a user zone.

The registration method chosen by a cellular carrier is a function of parameters such as the cellular system size, the expected mobility within the system, and call delivery statistics. Since systems may vary substantially with respect to these measures, CDMA specifications offer the multiple registration methods described above. The different registration procedures can be enabled or disabled independently allowing a cellular carrier to optimize the use of their system.

Registration is carried out with a registration message. FIG. 6 shows the structure of a registration message. The REG TYPE field is used to indicate timer-based, power up, zone-based, power down, parameter change, and ordered or distance based registration.

Registration may be one of two types: autonomous and non-autonomous. In an autonomous registration the mobile station initiates the registration in response to an event, without being explicitly directed to register by the base station controller. There are six forms of autonomous registrations, which are discussed below:

Power-up registration—The mobile registers when it powers on, switches from using the alternate serving system, or switches from using the analog system.

Power-down registration—The mobile registers when it powers off if previously registered in the current serving system.

Timer-based registration—The mobile registers when a timer expires.

Distance-based registration—The mobile registers when the distance between the current serving cell and the serving cell in which it last registers exceeds a threshold.

Zone-based registration—The mobile registers when it enters a new zone.

The various forms of autonomous registration can be globally enabled or disabled by the base station controller. The forms of registration that are enabled and the corresponding registration parameters are communicated in an overhead message transmitted on the CDMA paging channels.

Non-autonomous registration method include: ordered, traffic channel, parameter change, and implicit. All non-autonomous registration methods provide the ability to update the home location register (HLR)/visitor location register (VLR) when responding to orders on the paging channel, or using the access channel or traffic channel.

The cellular system may become aware of a mobile within its coverage area for which it does not possess all the information required to deliver a call (e.g., following receipt of an origination message from the mobile). In this case the cellular system can order the mobile to register using the request order.

FIG. 7 shows the structure of the request order and the fields contained in the order. The mobile responds to the request order with a registration message on the access channel and updates its data structures as for any other registration.

Another non-autonomous registration is traffic channel registration. Traffic channel registration refers to a method in which the mobile receives registration related information while on the traffic channel. Since the information exchange on the traffic channel causes less interference to other users than exchanges occurring on the paging and access channels, the CDMA system may provide for transmission of registration information on the traffic channel, preventing many instances of automatic registration following a call. One example where such registrations may occur is calls involving intersystem handoffs.

Provision of registration information to a mobile can be done following the reception of a release order from the mobile and prior to transmission of a release order to the mobile. At this stage, information exchanges between the base station and the mobile have no effect on voice quality.

FIG. 8 shows the structure of the parameter change registration. Certain parameters in the mobile may directly affect the process of delivering calls to the mobile and therefore should be updated in the system whenever a change in them occurs. These parameters are the mobile station's Station Class Mark (SCM), preferred slot cycle, and mobile-terminated call indicator.

The SCM can change in mobiles that can be attached to a vehicle and then detached and used as a portable phone. Since under these different circumstances the mobile would transmit different power and have different reception capabilities, the base station should be made aware of the change so it can use the information in its call delivery algorithm.

The preferred slot cycle index refers to a capability of certain CDMA phones to monitor the paging channel only in selected time slots, thus reducing processing load and increasing battery life. A base station that attempts to page a mobile station must be aware of the slot cycle being used by the mobile so that it transmits the pages in those slots in which the mobile station monitors the paging channel.

Finally, the mobile station maintains a call termination indicator. A CDMA phone may be programmed independently to accept calls when in the coverage area of a base station belonging to the system from which service is provided (the "home" system), when roaming in the serving system but a different network (a Network Identification "NID" roamer"), or when roaming in a different system (a Systems Identification "SID" roamer).

The call termination indicator is therefore a function of the mobile station's roaming status and the call termination preference programmed for that roaming status. If the call termination indicator changes, either due to a change in roaming status or to a change in preference), the base station should be notified so it can determine if pages should be transmitted to the mobile station.

Implicit registration occurs when the mobile station and base station exchange messages that are not directly related to registration but convey sufficient information to identify the mobile and its location (to within a base station coverage area) to the cellular system.

For compatibility with other registration schemes used in other wireless communication systems, the mobile station considers that it has implicitly registered only after a successful transmission of an origination message or a page response message.

During routine operation, the mobile station can provide status updates to the system in origination messages and page response messages. This capability reduces the number of registration messages that are needed.

FIG. 9 shows the fields required in the origination message. The origination message, sent by the mobile station, contains enough information to implicitly register the MS.

A number of issues are will known regarding paging of mobiles that are operating near system boundaries. Among these issues is the determination of the proper base station controller (BSC) for paging a mobile station that moves from one system to another. Autonomous registration after each change of system helps, but cannot completely resolve this problem. Since registration cannot be instantaneous, there is always some period during which the Home Location Register (HLR) is unaware that the mobile station has changed serving systems.

If autonomous registration occurs each time a mobile station enters a cell in a new serving system, another issue arises: mobile stations that register upon each change of serving system could issue an excessive number of registration requests when moving along a system boundary. This is because propagation effects can cause the optimum serving system from the mobile station's viewpoint to change rapidly while the mobile station is in motion.

The mobile station maintains a list of Systems Identification numbers (SID) and Network Identification numbers (NID) in which it registered, the SID_NID_LIST. When the mobile station registers in a given (SID/NID) pair, it add the pair to the list and starts a timer for the pair corresponding to the SID and NID in which it previously registered. If the mobile station returns to the coverage area of a base station that belongs to a (SID/NID) pair on its list, it does not re-register. Once a timer expires, the mobile station deletes the pair associated with the timer from the list. If the mobile station happens to be in the coverage area of a base station belonging to the (SID/NID) whose timer expired, it re-registers, adding the pair back to the list without a timer.

The BS can control storage of multiple SIDs and/or NIDs in the mobile station's SID_NID_LIST through the use of the MULT_SIDS and MULT_NIDS parameters sent in the system parameters message.

FIG. 10 shows the fields and fields lengths of the system parameters message. When MULT_SIDS is set to zero, the mobile station will not store multiple entries having identical SIDs. Thus, when it registers a particular (SID, NID) pair, it removes from the list another pair having a different SID if such exists. Similarly, when MULT_NIDS is set to zero, the mobile station stores only one (SID, NID) pair for every NID in which it registers.

The system parameters message control which types of registration are to be used in the system. From this overhead message the mobile station can determine which types are to be used, and the values of operation.

The REG_ZONE field is set to the registration zone of the base station. The TOTAL_ZONES field is set to the number of registration zones the mobile station is to retain for the purposes of zone-based registration. The ZONE_TIMER sets the length of the zone registration timer to be used by the mobile station. The ZONE_TIMER ranges from 1 to 60 minutes.

A key part of the registration process is assigning the mobile station an operating frequency. This frequency assignment also has implications for the system as a whole. Mobile stations should be distributed across multiple frequencies and bands so that interference is minimized and system operating parameters maintained in their optimum ranges. The goals of the registration process include distributing idle mobile stations between frequency bands, minimizing implementation time for changes to the registration process, minimizing message exchanges, especially registrations on band changes, avoiding mobile station redirection and re-assignment, and avoiding the use of a second paging channel, which adversely affects power usage and requires a second Walsh code.

Modifying the hashing process would lead to improved system performance. System performance could be enhanced if hashing could be alternatively enabled and disabled across frequency bands. Further system performance improvements would be possible if hashing weights could also be enabled and disabled across frequency bands. In the case of frequency band overlay, hysteresis could be provided for cross-band registrations with the use of overlay paging zones to reach those mobiles in the overlying frequency bands. Embodiments of the present invention offer the above hashing features.

The enhancements discussed above may be implemented with changes to the hashing process. One embodiment would allow different registration periods for different classes of mobile stations. This would allow the network to divide the mobile stations into classes such as regular and limited mobility. For the mobile stations with limited mobility, that is, those moving slowly or not at all through the system, may have a longer registration period.

An embodiment of the present invention would provide an improved mechanism to distribute mobile stations over frequency bands by utilizing inter-band hashing using the Extended CDMA Channel List Message (ECCLM).

A further embodiment would allow a band or subclass query of the network using the overhead channels. This may be a solution to the problem of frequent registrations due to a change of frequency band by the mobile station.

An embodiment of the invention provides enhancements to the ECCLM to allow improved hashing. The modifications allow MOB_P_REV based hashing. This would allow hashing based on the mobile station's maximum protocol revision.

A further embodiment would allow a non-uniform distribution of mobiles across frequencies through weight-based hashing. This may be accomplished by adding a new parameter to the ECCLM, frequency weight, for each frequency to indicate the weight associated with that frequency. These frequency weights are taken into account when hashing, that is, a larger weight assigned to a frequency results in more mobile stations hashed to that frequency.

A still further embodiment would allow inter-band hashing. This may be accomplished by adding a frequency band class and a frequency band subclass parameter to each listed frequency. These goals are achieved by adding band information to legacy frequencies in the legacy part of the ECCLM. Legacy frequencies are those utilized by existing IS-95 systems.

A mobile station may hash to a frequency on a different band subclass or different band class. The sub-band information allows a two level hashing process. Two level hashing reduces the number of band changes when the mobile station is in the idle state. In this embodiment the mobile station goes directly to the idle state. This action reduces the number of hops to the idle state in the new band or new frequency. This action is intended to be used in cases where the coverage of the different frequency bands is similar.

Figure 11:
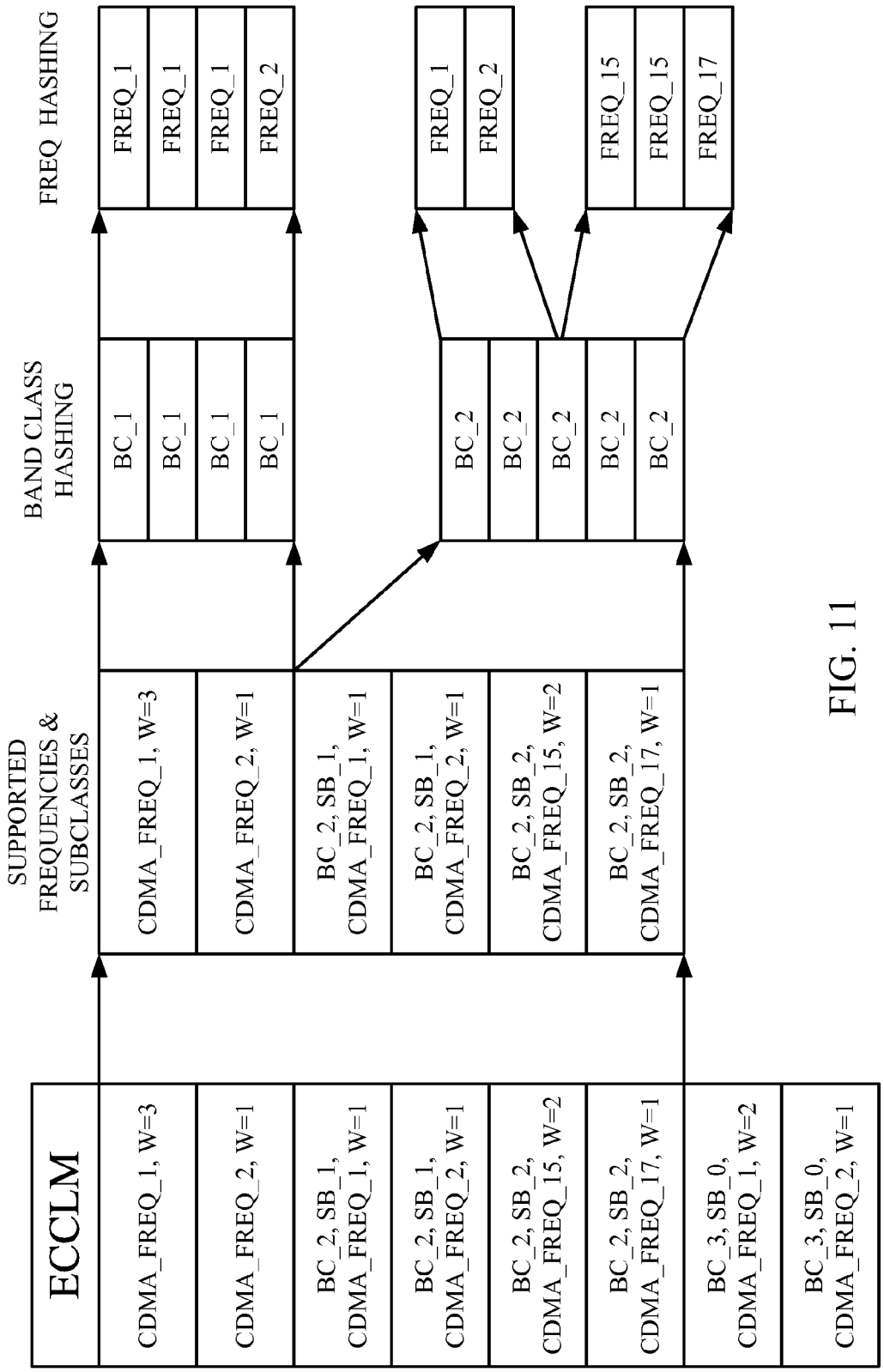
FIG. 11 shows weight-based hashing coupled with a two-level hashing logic ½.

FIG. 11 shows weight-based hashing coupled with a two-level hashing logic½ as described in the above paragraphs.

The above enhancements allow the mobile station to avoid registration if the ECCLM resulted in a frequency band change. This results in less drain on system resources since the mobile station avoids wasting battery power on receiving paging and redirection messages. In addition, drain on system resources is reduced, since the system needs to send fewer messages in order to hash mobile stations to frequencies.

The two level hashing reduces the occurrence of band changes by the mobile station when the mobile station performs and idle handoff, processes the new ECCLM, and ends up in the same band it was previously using. In addition two-level hashing isolates hashing within a frequency band while still allowing for a frequency band re-hash if needed.

Figure 12:
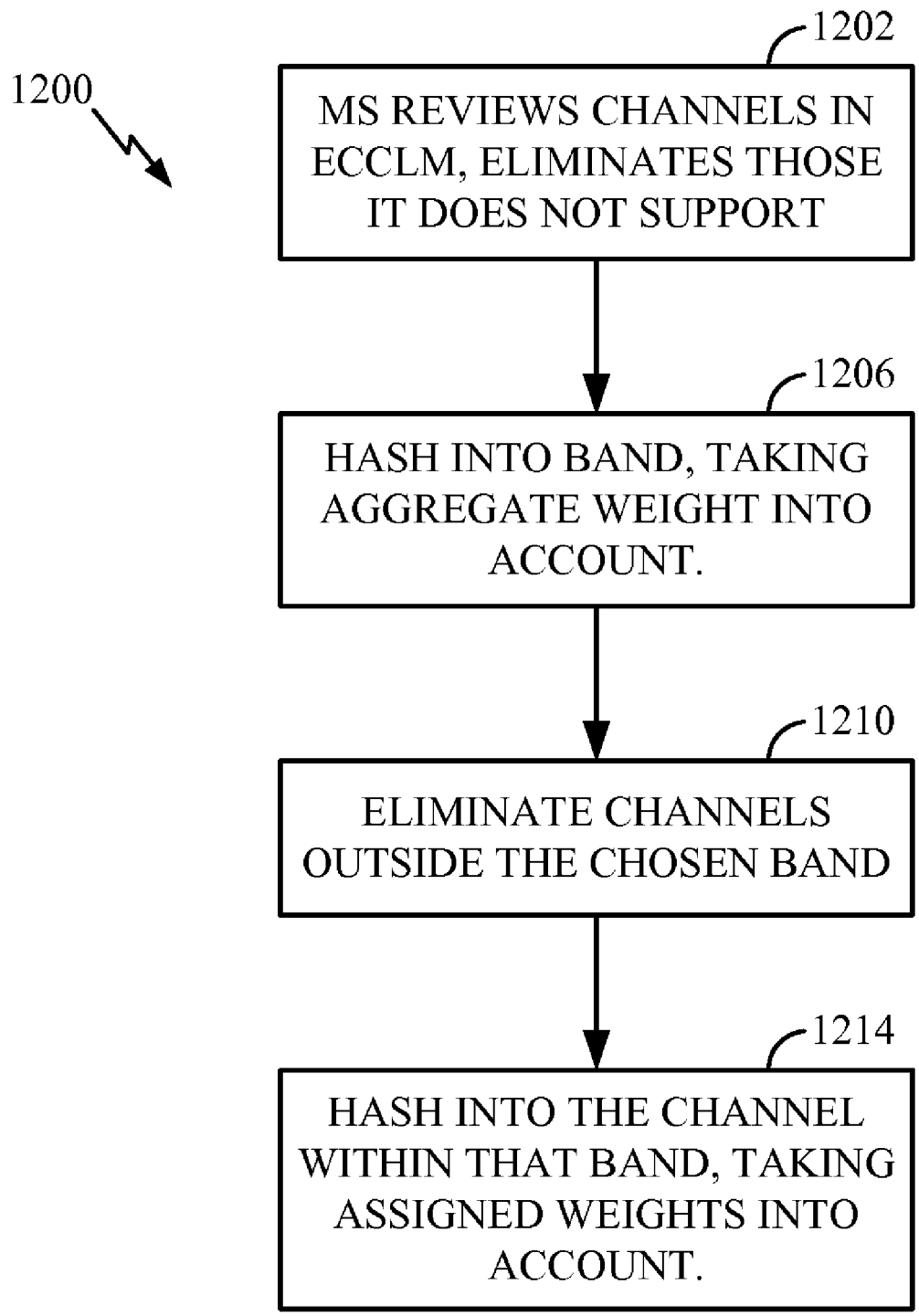
FIG. 12 is a flowchart of weight-based hashing coupled with a two level hashing logic, 2/2.

FIG. 12 illustrates the steps of the two-level hashing of an embodiment of the invention. The process, 1200, begins when the mobile station reviews the channels contained in the ECCLM and eliminates those channels it does not support, and sorts the bands and frequencies in order to provide stable hashing across base stations. In the past, mobile stations were required to support all channels. Since the introduction of new band classes that extend well beyond the current bands, this support cannot be guaranteed in the future. After reviewing the list of channels in the ECCLM, in step 1206, the MS hashes into a band, taking the aggregate weight assigned to the channels in that band into account. In step 1210 the MS eliminates channels in the ECCLM that are outside of the chosen frequency band. In step 1214 the MS hashes into a channel within the chosen frequency band, taking into account the assigned weights.

Inter-band hashing presents a potential problem that needs to be addressed. The MS may not support all the frequency bands or frequency band subclasses included in the ECCLM. The MS needs to skip over these frequency bands or frequency band subclasses to select a frequency. Sorting provides a mechanism to remove unsupported subclasses. However, the base station needs to know which frequency bands or frequency band subclasses the MS supports. In the overhead messages the base station signals which frequency bands and frequency band subclasses are deployed in that sector. In each registration, the MS indicates which ones on the base station list the MS supports. The network may also query as to the frequency band and frequency band subclasses that are supported. This information is received via a status request which is received by the Mobile Switching Center (MSC). The MSC passes that information down to each Base Station Controller (BSC) when sending a message to the MS. Even with inter-band hashing the MS must perform a power up registration whenever it changes frequency bands or frequency band subclasses.

Figure 13:
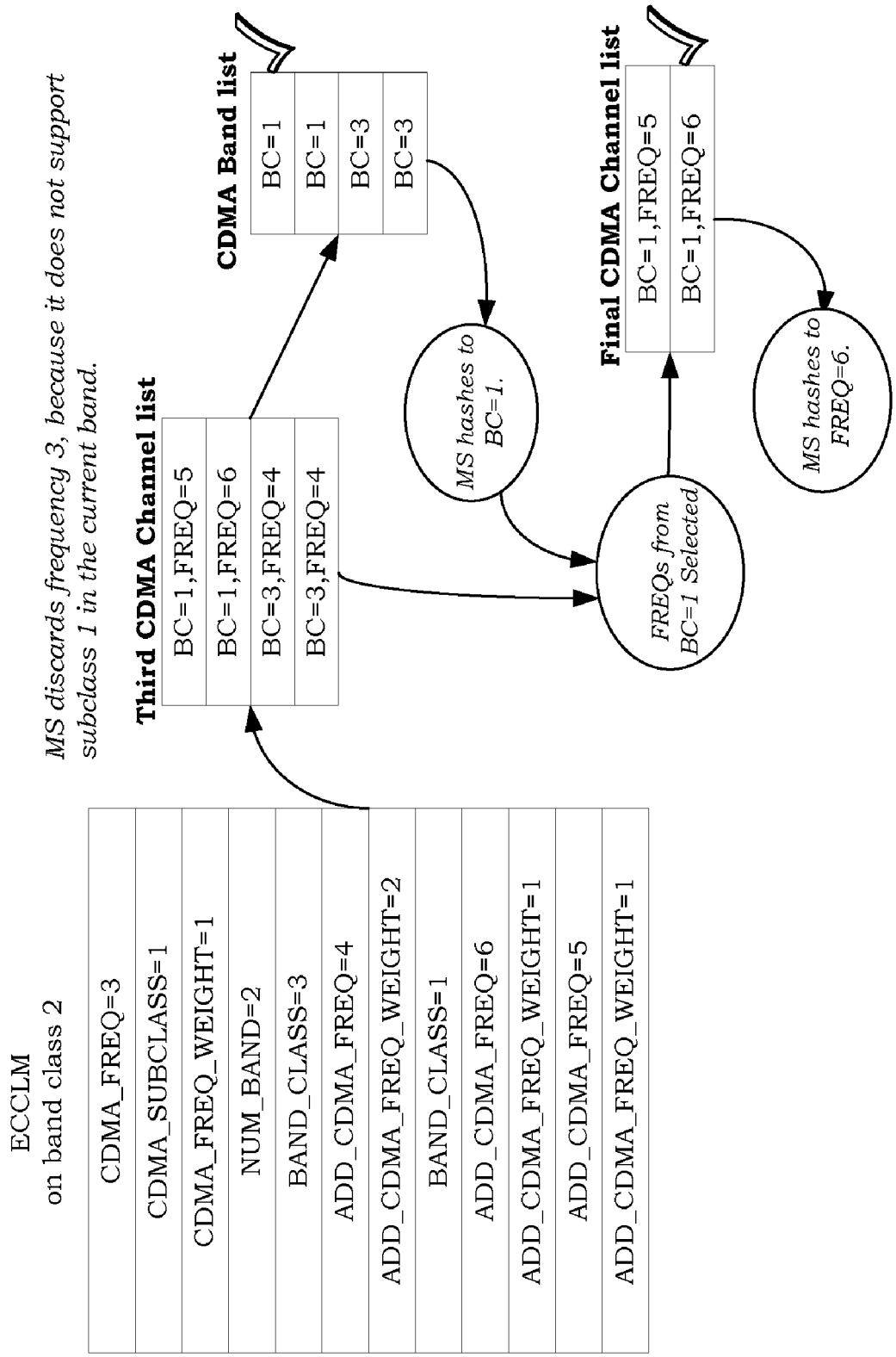
FIG. 13 shows sorting frequencies within a frequency band prior to hashing.

FIG. 13 illustrates two-level hashing with assigned weights. The ECCLM of band class 2 is transmitted to at least one mobile station. The mobile station sorts the third CDMA channel list and discards frequencies, such as frequency 3 in subclass 1, that are not supported. A two level hashing process, as described above, is then performed. Sorting bands and frequencies provides for stable hashing across base stations.

An additional embodiment would provide for the base station to signal in the overhead messages the frequency band or frequency band subclass of interest. The MS would indicate its capabilities during registration.

A further embodiment provides for the MS to indicate any change of hardware capability with one bit in the registration process. The MSC queries the MS for capabilities and uses this information for subsequent paging messages. The one bit added to the registration signals a mobile equipment change. This triggers the network to ask the MS about the new or different hardware capabilities.

Thus, a novel and improved method and apparatus for scheduling transmissions in a communications system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

In further embodiments, those skilled in the art will appreciate that the foregoing methods can be implemented by the execution of a program embodied on a computer readable medium, such are the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM or EEPROM), flash memory cards, an optical storage device (e.g., CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described or claimed in the singular, the plural is contemplated unless limitation to the singular is explicitly stated.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method comprising:
receiving a message at a mobile station; and
hashing the mobile station to a frequency band using inter-band hashing, wherein the inter-band hashing is based on the message, and wherein hashing is alternately enabled and disabled across a plurality of frequency bands, including enabling hashing for a first set of the plurality of frequency bands and disabling hashing for a second set of the plurality of frequency bands.

2. The method of claim 1, further comprising:
allowing a different length registration period for different classes of mobile stations.

3. The method of claim 2, further comprising:
placing mobile stations into classes, wherein the classes comprise regular and limited mobility classes; and
allowing a longer registration period for mobile stations in the limited mobility class.

4. The method of claim 1,
wherein the message includes a list of frequencies.

5. The method of claim 1, further comprising:
wherein the message contains information about protocol revisions supported by the first device.

6. The method of claim 1, wherein the message includes a list of frequency band classes, each of said frequency band classes having an assigned weight.

7. The method of claim 6, wherein the hashing weights are enabled and disabled across frequency bands.

8. The method of claim 1, wherein hashing further includes enabling and disabling hashing weights across the plurality of frequency bands.

9. A method comprising:
assigning a weight to each frequency within a frequency band;
alternately enabling and disabling hashing across a plurality of frequency bands, including enabling hashing for a first set of the plurality of frequency bands and disabling hashing for a second set of the plurality of frequency bands;
transmitting a message containing a list of the plurality of frequency bands to a mobile station, wherein the message includes information to enable the mobile station to hash to a frequency based on the weight assigned to the frequency and based on the enabling and the disabling of the hashing across the plurality of frequency bands; and
distributing mobile stations across frequencies based on the weights assigned to the frequencies, resulting in a non-uniform distribution of mobile stations across the frequencies within the frequency band.

10. The method of claim 9, further comprising:
signaling the mobile station the frequency band of interest.

11. The method of claim 10, further comprising:
signaling the mobile station the frequency of interest.

12. The method of claim 9, further comprising:
querying the mobile station to indicate any change of hardware capability during registration.

13. The method of claim 9, wherein hashing further includes enabling and disabling hashing weights across the plurality of frequency bands.

14. A non-transitory computer readable medium comprising computer-executable instructions, which when executed cause a computer to perform the actions of:
  receiving a message at a mobile station; and
  hashing the mobile station to a frequency band using inter-band hashing, wherein the inter-band hashing is based on the message, and wherein hashing is alternately enabled and disabled across a plurality of frequency bands, including enabling hashing for a first set of the plurality of frequency bands and disabling hashing for a second set of the plurality of frequency bands.

15. The non-transitory computer readable medium of claim 14, further comprising computer executable instructions for:
  allowing a different length registration period for different classes of mobile stations.

16. The non-transitory computer readable medium of claim 15, further comprising computer executable instructions for:
  placing mobile stations into classes, wherein the classes comprise regular and limited mobility classes; and
  allowing a longer registration period for mobile stations in the limited mobility class.

17. The non-transitory computer readable medium of claim 15, wherein hashing further includes enabling and disabling hashing weights across the plurality of frequency bands.

18. The non-transitory computer readable medium of claim 14, wherein the message includes a list of frequencies.

19. The non-transitory computer readable medium of claim 14, wherein the message contains information about protocol revisions supported by the first device.

20. The non-transitory computer readable medium of claim 14, wherein hashing further includes enabling and disabling hashing weights across the plurality of frequency bands.

21. A non-transitory computer readable medium comprising computer executable instructions, which when executed cause a computer to perform the actions of:
  assigning a weight to each frequency within a frequency band;
  alternately enabling and disabling hashing across a plurality of frequency bands, including enabling hashing for a first set of the plurality of frequency bands and disabling hashing for a second set of the plurality of frequency bands;
  transmitting a message containing a list of the plurality of frequency bands to a mobile station, wherein the message includes information to enable the mobile station to hash to a frequency based on the weight assigned to the frequency and based on the enabling and the disabling of the hashing across the plurality of frequency bands; and
  distributing mobile stations across frequencies based on the weights assigned to the frequencies, resulting in a non-uniform distribution of mobile stations across the frequencies within the frequency band.

22. The non-transitory computer readable medium of claim 21, further comprising instructions for:
  signaling the mobile station the frequency band of interest.

23. The non-transitory computer readable medium of claim 22, further comprising instructions for:
  signaling the mobile station the frequency of interest.

24. The non-transitory computer readable medium of claim 21, further comprising instructions for:
  querying the mobile station to indicate any change of hardware capability during registration.

25. The non-transitory computer readable medium of claim 21, wherein hashing further includes enabling and disabling hashing weights across the plurality of frequency bands.

26. An apparatus in a wireless communication system, comprising:
  means for receiving a message;
  means for hashing a mobile station to a frequency band using inter-band hashing, wherein the inter-band hashing is based on the message, wherein hashing is alternately enabled and disabled across the frequency bands, including enabling hashing for a first set of the plurality of frequency bands and disabling hashing for a second set of the plurality of frequency bands.

27. The apparatus of claim 26, wherein hashing further includes enabling and disabling hashing weights across the plurality of frequency bands.

28. An apparatus in a wireless communication system, comprising:
  means for assigning a weight to each frequency within more than one frequency band,
  means for alternately enabling and disabling hashing across a plurality of frequency bands, including enabling hashing for a first set of the plurality of frequency bands and disabling hashing for a second set of the plurality of frequency bands;
  means for transmitting a message containing a list of the plurality of frequency bands to a mobile station, wherein the message includes information to enable the mobile station to hash to a frequency band based on the weight assigned to the frequency and based on the enabling and the disabling of the hashing across the plurality of frequency bands; and
  means for distributing mobile stations across frequencies based on the weights assigned to the frequencies, resulting in a non-uniform distribution of mobile stations across the frequencies within the frequency band.

29. The apparatus of claim 28, wherein hashing further includes enabling and disabling hashing weights across the plurality of frequency bands.

30. A processor, comprising:
  first control logic, comprising hardware, for receiving a message at a mobile station; and
  second control logic for hashing the mobile station to a frequency band using inter-band hashing, wherein the inter-band hashing is based on the message, and wherein hashing is alternately enabled and disabled across a plurality of frequency bands, including enabling hashing for a first set of the plurality of frequency bands and disabling hashing for a second set of the plurality of frequency bands.

31. The processor of claim 30, wherein hashing further includes enabling and disabling hashing weights across the plurality of frequency bands.

32. An apparatus comprising:
  a receiver configured to receive a message; and
  a processor configured to hash the apparatus to a frequency band using inter-band hashing, wherein the inter-band hashing is based on the message, and wherein hashing is alternately enabled and disabled across a plurality of frequency bands, including enabling hashing for a first set of the plurality of frequency bands and disabling hashing for a second set of the plurality of frequency bands.

33. The apparatus of claim 32, wherein the processor is further configured to allow a different length registration period for different classes of mobile stations.

34. The apparatus of claim 33, wherein the processor is further configured to place mobile stations into classes, wherein the classes comprise regular and limited mobility classes; and to allow a longer registration period for mobile stations in the limited mobility class.

35. The apparatus of claim 32, wherein the message includes a list of frequencies.

36. The apparatus of claim 32, wherein the message contains information about protocol revisions supported by the first device.

37. The apparatus of claim 32, wherein the message includes a list of frequency band classes, each of said frequency band classes having an assigned weight.

38. The apparatus of claim 37, wherein the hashing weights are enabled and disabled across frequency bands.

39. The apparatus of claim 32, wherein hashing further includes enabling and disabling hashing weights across the plurality of frequency bands.

40. A processor, comprising
   first control logic for assigning a weight to each frequency within a frequency band;
   second control logic for alternately enabling and disabling hashing across a plurality of frequency bands, including enabling hashing for a first set of the plurality of frequency bands and the disabling hashing for a second set of the plurality of frequency bands;
   third control logic, comprising hardware, for transmitting a message containing a list of the plurality of frequency bands to a mobile station, wherein the message includes information to enable the mobile station to hash to a frequency based on the weight assigned to the frequency and based on the enabling and the disabling of the hashing across the plurality of frequency bands; and
   fourth control logic for distributing mobile stations across frequencies based on the weights assigned to the frequencies, resulting in a non-uniform distribution of mobile stations across the frequencies within the frequency band.

41. The processor of claim 40, wherein hashing further includes enabling and disabling hashing weights across the plurality of frequency bands.

42. An apparatus, comprising:
   a weighting component configured to assign a weight to each frequency within a frequency band and for alternately enabling and disabling hashing across a plurality of frequency bands, including enabling hashing for a first set of the plurality of frequency bands and disabling hashing for a second set of the plurality of frequency bands; and
   a transmitter, comprising hardware, configured to transmit a message containing a list of the plurality of frequency bands to a mobile station, wherein the message includes information to enable the mobile station to hash to a frequency based on the weight assigned to the frequency and based on the enabling and the disabling of the hashing across the plurality of frequency bands; wherein the mobile stations are distributed across frequencies based on the weights assigned to the frequencies, resulting in a non-uniform distribution of mobile stations across the frequencies within the frequency band.

43. The apparatus of claim 42, wherein the transmitter is further configured to signal the mobile station the frequency band of interest.

44. The apparatus of claim 43, wherein the transmitter is further configured to signal the mobile station the frequency of interest.

45. The apparatus of claim 42, further comprising a querying component configured to query the mobile station to indicate any change of hardware capability during registration.

46. The apparatus of claim 42, wherein hashing further includes enabling and disabling hashing weights across the plurality of frequency bands.

* * * * *